US008891589B2

(12) United States Patent
Wang et al.

(10) Patent No.: US 8,891,589 B2
(45) **Date of Patent: *Nov. 18, 2014**

(54) ANTENNA DIVERSITY CONTROL FOR BEAMFORMING IN AN ANTENNA ARRAY

(71) Applicant: Renda Trust, Pleasanton, CA (US)

(72) Inventors: James June-Ming Wang, San Marino, CA (US); Menno Marringa, Westbrook, CT (US)

(73) Assignee: Renda Trust, Pleasanton, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/867,645

(22) Filed: Apr. 22, 2013

(65) Prior Publication Data

US 2013/0294491 A1 Nov. 7, 2013

Related U.S. Application Data

(63) Continuation of application No. 12/537,258, filed on Aug. 7, 2009, now Pat. No. 8,428,105.

(51) Int. Cl.

| | |
|---|---|
| ***H04B 1/00*** | (2006.01) |
| ***H04B 7/08*** | (2006.01) |
| ***H04B 1/7075*** | (2011.01) |
| ***H04B 7/06*** | (2006.01) |

(52) U.S. Cl.

CPC .............. *H04B 7/0897* (2013.01); *H04B 7/086* (2013.01); *H04B 1/7075* (2013.01); *H04B 7/0617* (2013.01)

USPC .......................................................... 375/141

(58) Field of Classification Search

CPC .... H04B 1/7075; H04B 7/0617; H04B 7/086; H04B 7/0897

USPC ......... 375/140–152, 242, 243, 354, 362, 367, 375/267, 299, 295, 316, 259; 455/130, 455/150.1, 196.1, 193.1; 341/126, 155, 172

See application file for complete search history.

(56) References Cited

U.S. PATENT DOCUMENTS

| | | | | |
|---|---|---|---|---|
| 6,438,389 | B1 | 8/2002 | Sandhu et al. | |
| 6,907,272 | B2 * | 6/2005 | Roy | 455/562.1 |
| 7,095,814 | B2 | 8/2006 | Kyeong et al. | |
| 7,450,959 | B2 | 11/2008 | Lin et al. | |
| 2002/0154687 | A1 | 10/2002 | Bierly et al. | |
| 2003/0162566 | A1 | 8/2003 | Shapira et al. | |
| 2004/0209579 | A1 | 10/2004 | Vaidyanathan | |
| 2006/0048061 | A1 | 3/2006 | Forlenza et al. | |
| 2006/0073801 | A1 * | 4/2006 | Wang et al. | 455/226.1 |
| 2006/0111050 | A1 * | 5/2006 | Choi et al. | 455/67.11 |
| 2006/0186995 | A1 | 8/2006 | Wu et al. | |

* cited by examiner

*Primary Examiner* — Vineeta Panwalkar
(74) *Attorney, Agent, or Firm* — Duane Morris LLP

(57) ABSTRACT

Techniques for controlling diversity beamforming antenna array is disclosed. One aspect of the techniques is to utilize low-power and low area circuits to achieve combining gains, mitigate the effects of multipath fading, provide spatial suppression and diversity gains to a single input receiver. The device is radiofrequency transparent yet provides antenna gain by selective three G and four G code acquisition and tracking of a desired downlink channel.

1 Claim, 10 Drawing Sheets

ANTENNA DIVERSITY CONTROL FOR BEAMFORMING IN AN ANTENNA ARRAY

CROSS-REFERENCE TO RELATED APPLICATIONS

This application is a continuation of U.S. Ser. No. 12/537,258 filed Aug. 2, 2009 (now U.S. Pat. No. 8,428,015), which application is fully incorporated herein by reference.

BACKGROUND OF THE INVENTION

Far beyond the requirements of voice communications, the rapid growth in wireless distribution of music, video, applications, images, news, and entertainment has driven service providers to address network capacity. In an indoor environment, or outdoors with significant multipath, the received signal can arrive via many paths and angles, and bluffs, the signal and gene may not be concentrated in one beam. In a network where mobile terminals receive multiple baseband signal station signals simultaneously, the interference from adjacent cells can become the dominant performance limiting factor. Since wireless adapters and handsets within a cell share the downlink channel, service providers must continue to invest in enhancing their infrastructure. However consumer product grade handsets and wireless adapters are sometimes considered disposable or have relatively shorter useful life, due to battery life or the advent of fashionable killer applications and features.

Significant handsets and wireless adapter design effort is invested into support for latest generation standards, improving battery life, enriching the multimedia experience, and providing additional services such as location. Between generational design cycles, a significant gain in network capacity can be achieved from adoption of high-performance wireless adapters using an adaptive phased array antenna device to suppress noise and interference and increase gain without substantially redesigning the receivers, their firmware, or protocols.

Thus, it can be appreciated that what is needed is an apparatus to achieve higher downlink throughputs and reduced download times, increased sensitivity, more uniform coverage, to increase network capacity, without requiring green field redesign of wireless infrastructure, adapters, and handsets.

SUMMARY OF THE INVENTION

Figure 1:
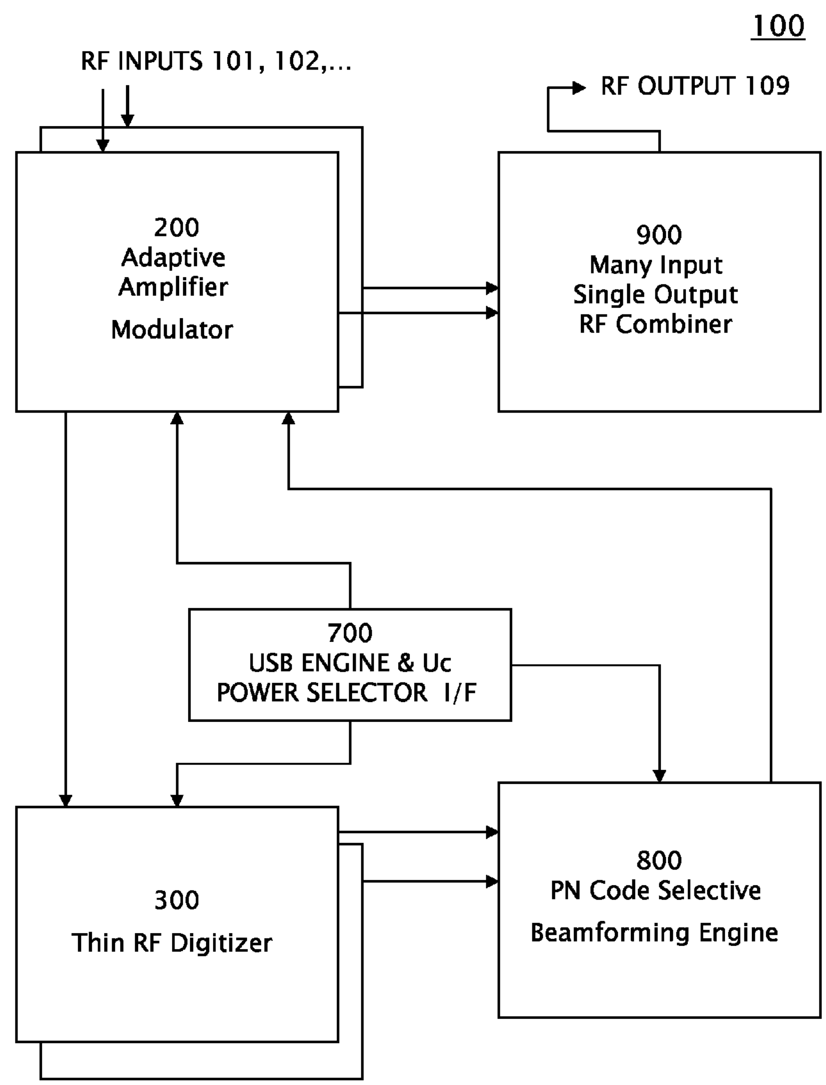
FIG. 1 is a block diagram showing signal flow inputs and outputs.

A single chip diversity beamforming antenna array processor is disclosed. The processor utilizes low-power and low area circuits to achieve combining gain, mitigate the effects of multipath fading, provide spatial suppression, and provide diversity gain to a single input receiver. The device is radiofrequency transparent yet provides antenna gain by selective three G and four G code acquisition and tracking of a desired downlink channel.

Each de-spreader circuit obtains a PN code of a desired base station received from the baseband processor using standard commands. This allows fast integration with legacy design without modification to baseband circuits for Firmware. The results maximize the signal from a desired base station while minimizing both the noise and interfering signals from adjacent base stations.

Only the signal from the desired base station is correlated and the relative phase and amplitude of signal from each antenna is computed.

A weight for each antenna is computed including the difference of the phase of the signal with respect to a reference signal. The reference signal is the maximal ratio combining signal A thin radiofrequency digitizer substantially reduces the cost and power consumption of quantifying each antenna elements energy input.

DETAILED DISCLOSURE OF EMBODIMENTS

The details of one or more embodiments of the invention are set forth in the accompanying drawings and the description below. Other features, objects, and advantages of the invention will be apparent from the description and drawings, and from the claims.

The present invention comprises a Radio Frequency Signal (RF) Output (suitable for coupling to a single input receiver) coupled to a conventional Many Input Single Output Radio Frequency Combiner device. The Radiofrequency Signal Combiner device is coupled to a plurality of Adaptive Amplifier Modulator circuits. Each adaptive amplifier modulator circuit is coupled to a radiofrequency signal (RF) Input.

Each Adaptive Amplifier Modulator is coupled to a Thin Radiofrequency Signal Digitizer circuit. A Sampling Oscillator is coupled to a plurality of Thin Radiofrequency Signal Digitizer circuits.

A PN Code Selective Beamforming Engine is coupled to a plurality of Adaptive Amplifier Modulator circuits whereby complex weights are applied to cancel noise and cancel non-desired signal energy.

The PN Code Selective Beamforming Engine is further coupled to a plurality of Thin Radiofrequency Signal Digitizer circuits whereby a digital I and Q value is obtained from each antenna element, de-spread, and scaled.

The PN Code Selective Beamforming Engine is further coupled to a USB engine and a micro controller with an interface to a baseband processor to provide PN spreading codes to the beamforming engine.

Two embodiments of an adaptive amplifier modulator are disclosed. The adaptive amplifier modulator receives a radiofrequency signal input from an antenna element and also receives complex weights for each antenna element from the PN code selective beam forming engine. A pair of Cartesian weights for I and Q are used to modulate the signal which is emitted from the radiofrequency signal output. Alternatively, weights can be in the form of amplitude adjustment and phase rotation to modulate the signal. In a preferred embodiment, the adaptive amplifier modulator has a band-pass frequency response with bandwidth greater than the signal operation band of interest but substantially less than the carrier frequency.

In a first embodiment the adaptive amplifier modulator comprises a modulator coupled to the radiofrequency signal output and coupled to a low noise amplifier. In this embodiment the same signal emitted by the low noise amplifier and input to the modulator is additionally coupled as an output to the thin radiofrequency signal digitizer. The low noise amplifier is further coupled to the radiofrequency signal input. In this embodiment the signal provided to the thin radiofrequency signal digitizer has not been modulated with the weights for this channel.

In a second embodiment, the adaptive amplifier modulator comprises an integrated low noise amplifier modulator. Both the radiofrequency signal output and the thin radiofrequency signal digitizer are coupled to the output of the integrated low noise amplifier modulator. The inputs coupled to the integrated low noise amplifier modulator are the complex weight from the PN code selective beamforming engine and the radiofrequency signal input. In this embodiment the signal provided to the thin radiofrequency signal digitizer has been modulated with the weights for this channel whereby the signal is already amplitude scaled.

Figure 3A:
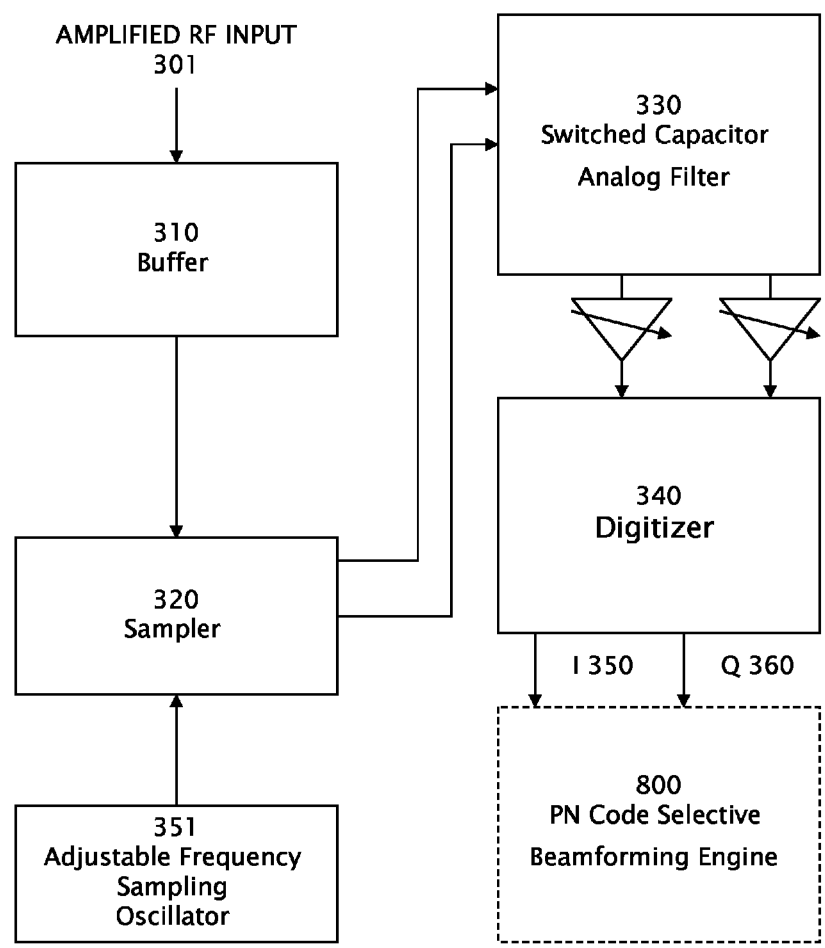
FIGS. 3A and 3B show block diagrams and signal flow of an embodiment of a sub circuit.

Each Thin Radiofrequency Signal Digitizer comprises a Buffer, a Sampler, a Switch Capacitor Analog Filter, and a Digitizer. The buffer is coupled to the adaptive amplifier modulator. In an embodiment the buffer is coupled to the output of an integrated low noise amplifier and modulator. In an embodiment the buffer is coupled to the output of a low noise amplifier which is the input to a modulator. A sampler is coupled to the buffer and is controlled by a sampling oscillator. This sampler performs under sampling at a certain frequency but not digitizing. The simple sampling oscillator is distinguished from a voltage controlled oscillator at or close to the carrier frequency of the signal as those used in a direct conversion or super-heterodyne receiver. The simple sampling oscillator is not a RF frequency synthesizer. The frequency of the simple sampling oscillator is at or greater than the Nyquist bandwidth of the band-pass LNA and modulator. In an embodiment the simple sampling oscillator is substantially at 150 MHz but this is only an exemplary frequency. In an embodiment to provide in-phase and quadrature-phase baseband signals at the output of sampler, two samplers are used for each RF signal, one operates at sampling clock and a second one operates at a second sampling clock which is derived from the first sampling clock but offset in clock phase by 90 degree phase. (Note that an additional diagram similar to FIG. 3A is provided below to show I and Q sampling). A phase shifter is used to derive the second sampling clock from the first sampling clock. In a different embodiment, one simple sampler can be used to under-sampling the signal to provide a low-IF signal.

Note that the sampling oscillator provides the clock for under-sampling the RF input signal. The under-sampling technique performed on a band-pass signal has the effects of down-converting the signal to the baseband bandwidth of $(-f_{s/2}, +f_{s/2})$. Signal content within the bandwidth of $(-f._{s/2}+nf_s, f_{s/2}+nf_s)$, n=0,1,2, . . . will be folded into the baseband frequency. Thus, it is essential that the frontend RF bandwidth is less than $f_s$ to prevent aliasing, i.e., unwanted signal being folded into the baseband. For under-sampling to low IF signal, the sampling clock would satisfy the equation $fc=k*f_s+fif$, where fif is the low IF frequency.

The RF band could contains multiple UMTS 5 MHz channels. In order to select the desired channel to pass through the baseband switched-capacitor filter, the sample clock needs to satisfy the following equation $f_c=k*f_s$, where $f_c$ is the center frequency of the desired RF channel. Satisfying the preceding equation is equivalent to down-convert the center frequency to DC frequency. Thus, the simple sampling oscillator needs to be adjustable in frequency.

Another approach is to make the switched capacitor filter a tunable filter with adjustable center frequency and employs a fixed frequency sampling clock. The tunable filter will center at the desired frequency channel after under-sampling and remove the unwanted RF channel signals.

An example embodiment for the simple sampling oscillator is to employ a DDS (Direct digital synthesizer) driven by an on-chip oscillator and external crystal which provides the adjustable frequency required for under-sampling RF signal down to baseband. The adjustable frequency also selects the desired channel to pass through channel filter. The N.sup.th harmonics of the DAC output of the DDS is extracted by an on-chip filter and used for the sample-and-hold circuit at RF. Another embodiment for simple sampling oscillator is to employ a ring oscillator and synthesizer which phase-locked to a crystal oscillator. The ring oscillator is a low cost and low power implementation of variable frequency oscillator which use inverters, resistors and capacitors to provide signal at frequency in the range of tens megahertz to a few hundreds megahertz. At this frequency range, the synthesizer circuit can be implemented mostly with CMOS logic.

The on-chip filter can be realized with combination of notch filter and band-pass filter to remove unwanted harmonics of the DDS output. The filter needs to be tunable over the adjustable range of DDS. In general, the higher oscillator frequency is desirable to alleviate the filter requirement. If an oscillator output can directly drive DDS to produce the desired sampling frequency, a simple low pass filter is sufficient. This means that oscillator and DDS need to be approximately 400 MHz (200 Mhz×2). Alternatively, the third harmonics of DDS can be used. This mean that DDS and oscillator frequency will be 130 MHz. The filter needs to reject the first harmonic by at least 25 dB.

It should be noted that the sampling clock is selected such that under-sampled RF signal should fall within the bandwidth of the channel filter. The RF signal frequency should be integer multiple of the sampling clock. Thus, the sampling clock should be adjustable over the RF band, which is 60 MHz for Band I and II, 75 MHz for band III, 45 MHz for band IV, 25 MHz for band V, and 35 MHz for band VIII. Note that ADC clock is divided down from sampling clock. The ADC clock does not need to synchronize to any of the RF signal, it needs to be high enough to prevent aliasing at channel filter output.

The sampler is further coupled to a switch capacitor analog filter configured to be less than the channel bandwidth. In an embodiment this is an adjustable bandwidth. In an embodiment this is a 5 MHz bandwidth. A digitizer circuit is coupled to the switch capacitor analog filter and is further coupled to the PN code selective beamforming engine. A digital value for I and a digital value for Q is provided from each Thin RF digitizer. For a 4G implementation other bandwidths are appropriate. It is the observation of the inventor that a digitizer only operates properly within a range of signal level. To accommodate different signal dynamic, an automatic gain adjustment control circuit is employed to amplify the signal to the proper range before digitizing. For this invention, the same amount of gain should be provided all signals from different RF inputs. One embodiment is to compare the total signal powers out of the channel filter (switch capacitor filter) against a reference level and adjust the gain for all signals accordingly until total signal powers equal reference level.

The PN code selective beam forming engine comprises a weight magnitude normalization circuit which is coupled to a plurality of adaptive amplifier modulator circuits whereby pairs of weights are provided to each antenna channel. The weight magnitude normalizations circuit is coupled to a weight phaser angle circuit whereby the sum of the squares of the weights is adjusted to be a constant. Another embodiment of weight magnitude normalizations circuit is to adjust magnitude of all weights by a same factor until the power of the reference signal equals a constant. The weight phaser angle circuit is further coupled to a reference signal circuit to determine the phaser angle between each signal and reference signal. The reference signal circuit is further coupled to a plurality of de-spreaders. The reference signal is the maximal ratio combining signal of all the antennas. Each of the de-spreaders provides de-spread I and Q and its scaled factor as outputs to the reference signal circuit. The de-spreader circuit receives a pair of spread I and Q signals from a thin radiofrequency signal digitizer. It is noted that the PN code selective beamforming engine provides a feedback loop between the thin RF digitizer and the adaptive amplifier modulator.

The de-spreader comprises pair of mixers coupled to a pair of low pass filters on their output and further coupled to a code generator acquisition and tracking circuit. One set is coupled to the spread I channel of a digitizer and the other set is coupled to the spread Q channel of digitizer. The low pass filters remove the unwanted noise and interference and provide de-spread I and Q for the desired signal.

A scale factor circuit is coupled to the output of the low pass filters to receive the de-spread signal and further coupled to the input of the mixers. The output of each scale factor circuit is coupled to the reference signal circuit.

The relative phases and amplitudes of the received signals from all antennas are derived after the de-spreader. This ensures that the only signal from the "desired" base station are being correlated and the relative phase and signal of signal from each antenna is computed. The interfering signals from adjacent base station are treated the same way as noise. The results are suppression of both noise and interring signals.

The reference signal is derived as the scaled sum of de-spreader outputs. The scaling factor for each signal are the square root of signal-to-noise (+interference) ratio at each de-spreader. The signal portion is sampled at the de-spreader LPF (low pass filter) output where all interfering signal are cleaned up, filtered, and only the desired signal is left. The noise (+interference) level is sampled before the de-spreader LPF output. The reference signal is actually the maximal ratio combining signal.

$\text{Scaled Factor}_i = \text{Squareroot}\ [\text{Signal}_i/(\text{Noise}_i + \text{Interference}_i)]$ $\text{Reference Signal} = .\Sigma_i = 1,2,\ .\ .\ .\ _N\ \text{Scaled Factor}_i * \text{LPF\_out}_i \text{where } i = 1,2,3,\ .\ .\ .\ N$ Note that the weight for each antenna is the scaled factor times a unit complex vector. The phase of the complex factor is the difference of the phase of signal from each antenna and the reference signal. The phase difference is derived by complex conjugating the de-spreader LPF output and multiplying it with reference signal. The resulting phasor angle is the phase difference between each antenna and the reference signal.

Note that the phase is complex conjugate of individual multiplied by "non" complex conjugate of reference. This provides correct direction of phase rotation for each signal so that all signals after rotation (weight applied) are in-phase.

$\text{Weight}_i = \text{Scaled Factor}_i * e^{(j\theta i)} \text{ where } i = 1,2,3,\ .\ .\ .\ N$ Note that the results will maximize the signal from desired base station while minimize the noise and the interfering signal from adjacent base stations. Thus, beam-forming operator sometimes forms a beam toward desired base station and sometimes forms a null (or multiple nulls) toward interfering base station.

The de-spreader gets the PN code of the desired base station by querying the baseband processor (UMTS modem) using the standard AT commands which is defined in UMTS specifications. This allows fast integration with legacy design and no needs to modify the baseband firmware. In an alternate embodiment, the receiver baseband processor of the modem can set the PN code used in the de-spreader. Note that the present invention does not preclude other means of interfacing to the modem baseband processor.

The present invention comprises a method for operating an apparatus; the apparatus comprising him any input single output RF combiner device coupled to a plurality off adaptive amplifier modulator circuits, each adaptive amplifier modulator circuit coupled to a thin RF digitizer circuit, and to PN code selective beamforming engine circuit. The apparatus further comprising a USB engine and microcode power selector interface whereby power may be conserved by powering down certain circuits and PN codes may be obtained for de-spreading the signal and distinguishing the selected base station from adjacent unwanted base stations.

The method comprising the steps of:

receiving radio frequency energy from each of a plurality of elements of an adaptive array antenna;

economically and efficiently determining a digital amplitude and phase for each antenna element, de-spreading each signal by multiplying the I and the Q complement with a code generator acquisition and tracking circuit output, determining a scale factor and a selected I and a selected Q value for each antenna element, or, determining a scale factor and phase shift for each antenna element, determining a reference signal, determining a phaser angle correction between the reference signal and each antenna element, normalizing the weights, modulating each antenna signal by the weights, and combining the resulting modulated radio frequency energy from all antenna elements as an input to a single input receiver.

Referring to FIG. 1, a solid-state device is disclosed comprising the following circuits:

a plurality of adaptive amplifier modulator circuits 200;

at least one thin radiofrequency digitizer circuit 300;

a USB engine and microcode power selector interface 700;

a PN code selective beamforming engine circuit 800; and a many input single output radio frequency (RF) combiner circuit 900.

Figure 2A:
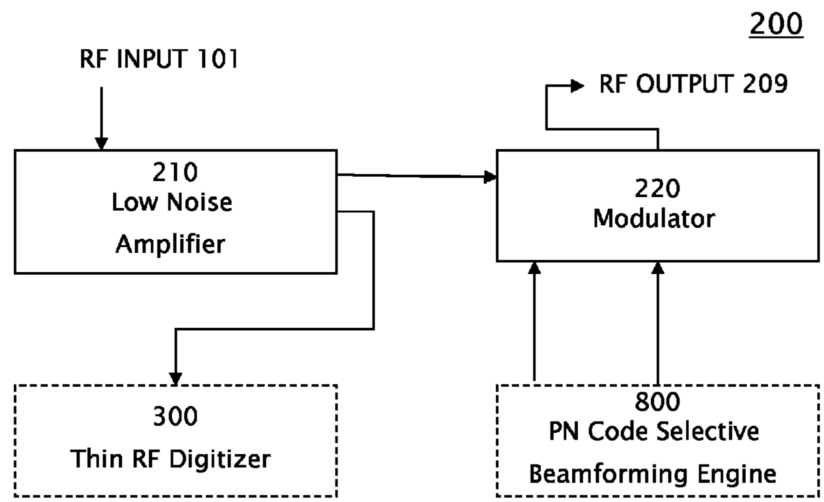
FIGS. 2A and 2B show a block diagram and signal flow of two embodiments of a sub circuit.

Referring to FIG. 2A, in an embodiment, the adaptive amplifier modulator circuit 200 comprises a low noise amplifier circuit 210, and a modulator circuit 220, the modulator circuit coupled to a radiofrequency output and a PN code selective beamforming engine circuit 800 whereby the radiofrequency output is controlled by a plurality of weights, a radiofrequency input coupled to the low noise amplifier 210, and a thin radiofrequency digitizer circuit 300 coupled to the output of the low noise amplifier circuit 210.

Figure 2B:
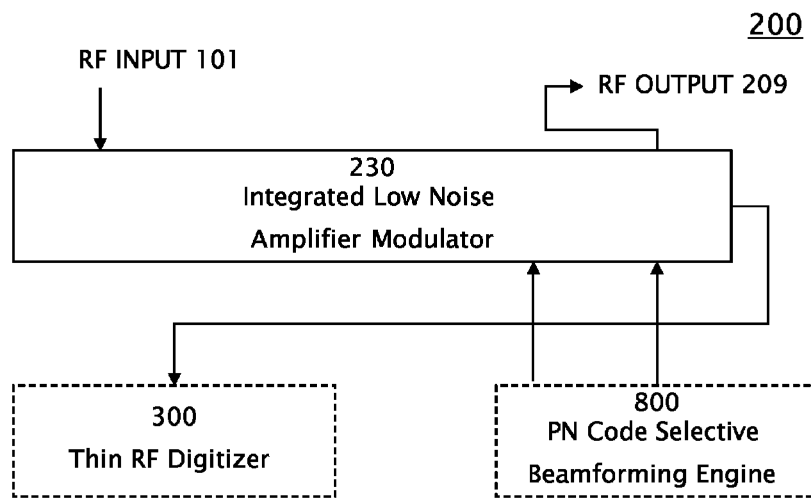

Referring to FIG. 2B, in an embodiment, the adaptive amplifier modulator circuit 200 comprises an integrated low noise amplifier modulator circuit 230;

the integrated low noise amplifier modulator circuit coupled to a radiofrequency output and a PN code selective beamforming engine circuit 800 whereby the radiofrequency output is controlled by a plurality of weights, a radiofrequency input coupled to the integrated low noise amplifier modulator circuit 230, and a thin radiofrequency digitizer circuit 300 coupled to the output of the integrated low noise amplifier modulator circuit 230.

In an embodiment, the adaptive amplifier modulator circuit 200 further comprises a power conservation circuit coupled to the USB engine and microcode power selector interface 700.

In an embodiment, the thin radiofrequency digitizer circuit 300 comprises:

a buffer 310, a sampler 320, a sampling oscillator 350, a switched capacitor analog filter 330, and a digitizer 340, the digitizer coupled to a PN code selective beamforming engine 800 by a digital amplitude output 350 and a digital phase output 360, the switched capacitor analog filter 330 coupled between the digitizer 340 and the sampler 320, the sampler 320 further coupled between the sampling oscillator 351 and the buffer 310 and the buffer further coupled to the circuit input.

Referring to FIG. 3A, in an embodiment, the thin radiofrequency digitizer circuit 300 comprises:

a buffer 310, a sampler 320, and adjustable frequency sampling oscillator 351, a switched capacitor analog filter 330, and a digitizer 340, the digitizer coupled to a PN code selective beamforming engine 800 by a digital amplitude output 350 and a digital phase output 360, the switched capacitor analog filter 331 coupled between the digitizer 340 and the sampler 320, the sampler 320 further coupled between the adjustable frequency sampling oscillator 351 and the buffer 310 and the buffer further coupled to the circuit input.

Figure 3B:
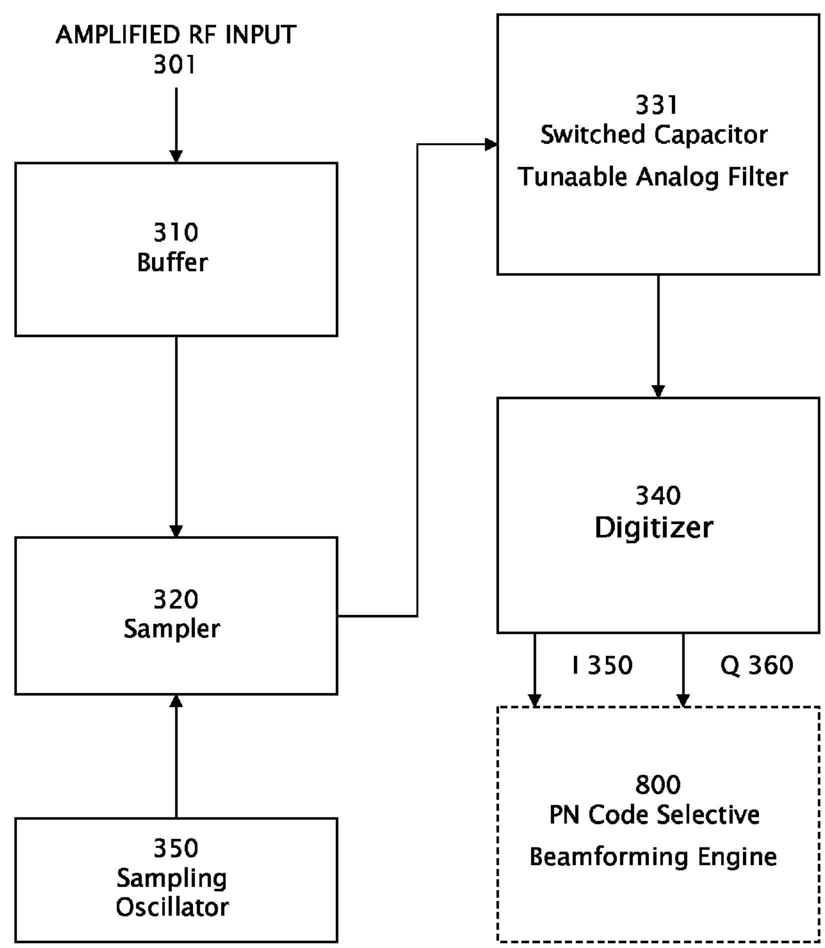

Referring to FIG. 3B, in an embodiment, the thin radiofrequency digitizer circuit 300 comprises a buffer 310, a sampler 320, a sampling oscillator 350, a switched capacitor tunable analog filter 331, and a digitizer 340, the digitizer coupled to a PN code selective beamforming engine 800 by a digital amplitude output 350 and a digital phase output 360, the switched capacitor tunable analog filter 331 coupled between the digitizer 340 and the sampler 320, the sampler 320 further coupled between the sampling oscillator 351 and the buffer 310 and the buffer further coupled to the circuit input.

In an embodiment, the sampling oscillator comprises a direct digital synthesizer driven by an on-chip oscillator and an external crystal for to provide an adjustable frequency for under sampling a radiofrequency signal down to broad them and selecting the desired channel to pass through the channel filter.

In an embodiment, the thin radiofrequency digitizer circuit 300 further comprising a power conservation circuit coupled to the USB engine and microcode power selector interface 700.

Figure 4:
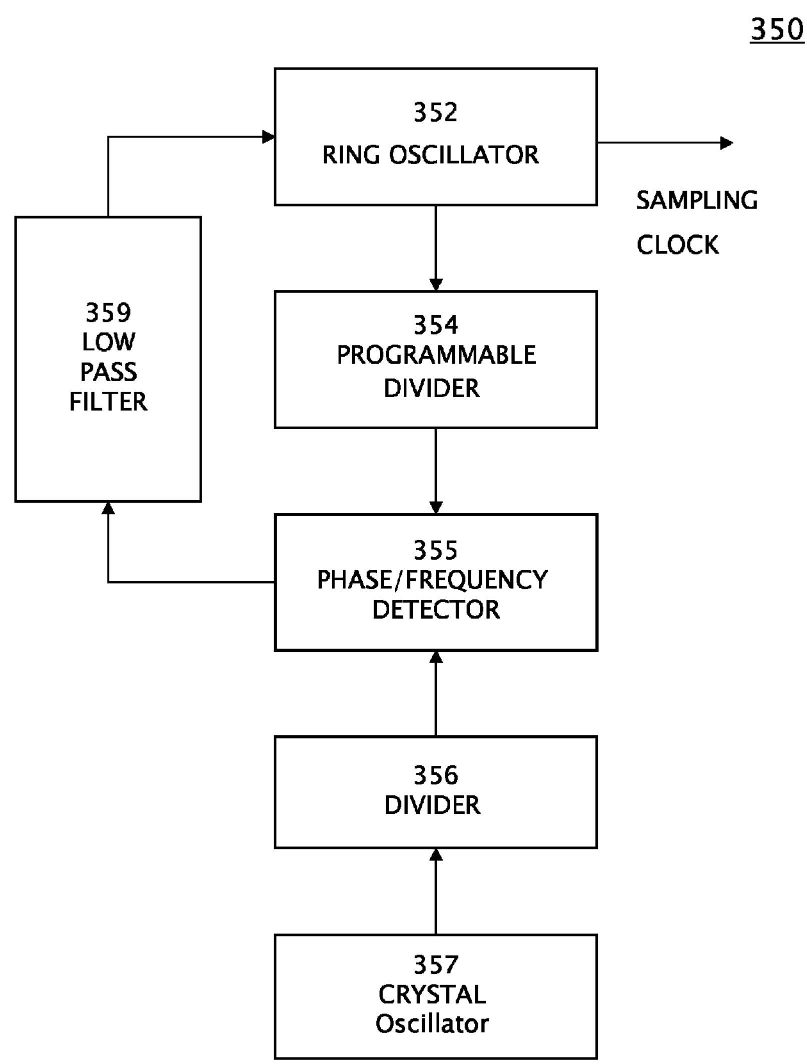
FIG. 4 is a circuit schematic.

Referring to FIG. 4, in an embodiment, is a block diagram of sampling clock generator which employs a ring oscillator. Ring oscillator is low power, small, and quite easy to implement using inverter and some R/C components to generate delay, which sets the frequency. It is perfect for the clock frequency that we are interested in. The frequency of ring oscillator is adjustable. This embodiment is easily distinguishable from a conventional Local Oscillator in a receiver which, at high frequency, employs inductor and capacitor in the tank to realize good phase noise. It is big (inductor) and consumes more power. Synthesizer circuit also consumes high power since it operates at RF frequency.

A divider circuit 356 couples a crystal oscillator 357 to a phase/frequency detector circuit 355. The phrase/frequency detector circuit further couples any low pass filter 359 and a programmable divider circuit 354. A ring oscillator 352 is coupled to a low pass filter 359 and to a programmable divider 354. The ring oscillator 352 is further couples to the circuit output comprising a sampling clock for to control the sampler 320.

Figure 5:
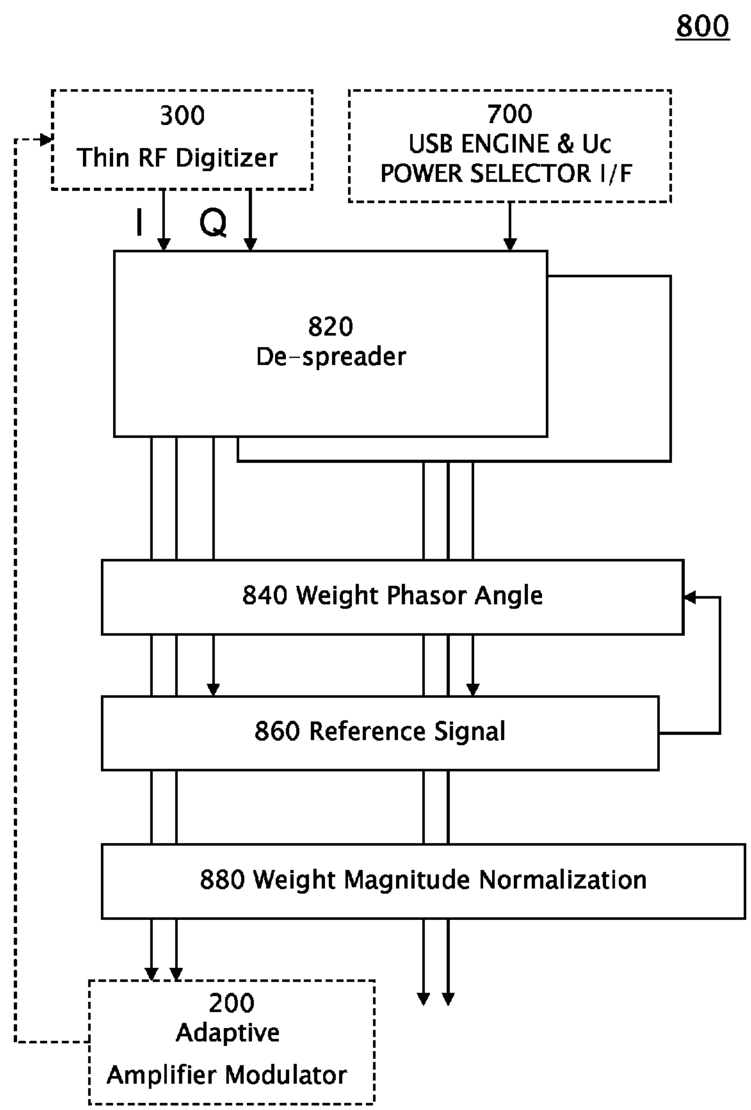
FIG. 5 shows a block diagram and signal flow of a sub circuit.

Referring to FIG. 5, in an embodiment, the PN code selective beamforming engine circuit 800 comprises:

a plurality of de-spreader circuits 820, a weight phasor angle circuit 840, a reference signal circuit 860, and a weight magnitude normalization circuit 880, the weight magnitude normalization circuit coupled to the adaptive amplifier modulator circuit 200, the reference signal circuit coupled to the weight magnitude normalization circuit 880 and further coupled to the weight phasor angle circuit 840, and a plurality of de-spreader circuits 820, the weight phasor angle circuit 840 coupled to the reference signal circuit 860 and to a plurality of de-spreader circuits 820, and each de-spreader circuit 820 further coupled to a thin radiofrequency digitizer circuit by an amplitude input and a phase input hands to the USB engine and microcode power selector interface 700.

In an embodiment, the de-spreader circuit 820 comprises a power conservation circuit coupled to the USB engine and microcode power selector interface 700.

Figure 6A:
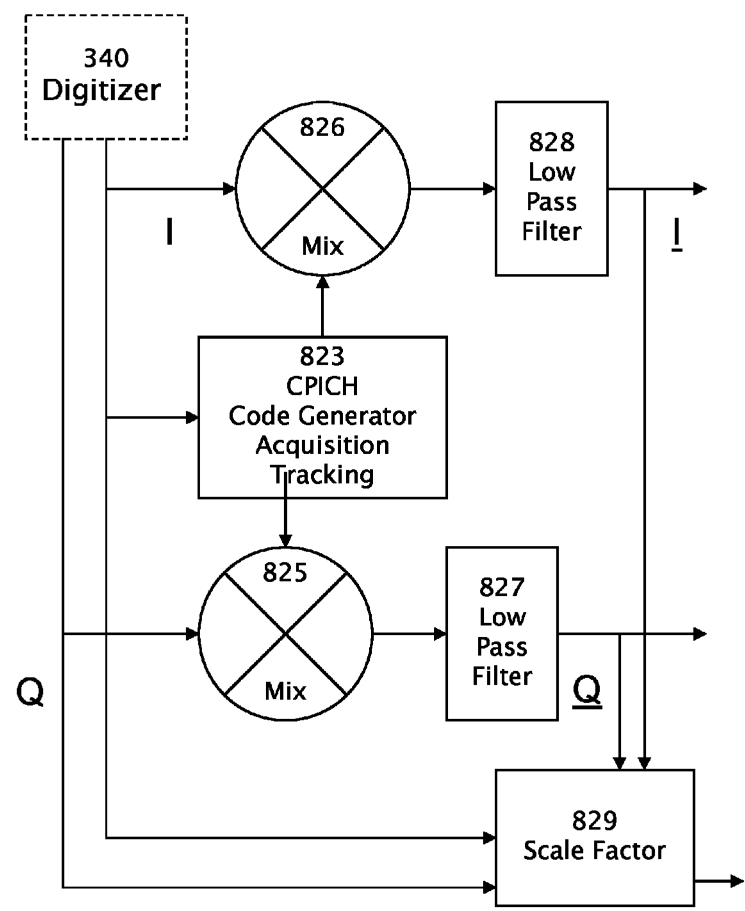
FIGS. 6A and 6B show a circuit schematic.

Referring to FIGS. 6A&B, in an embodiment, the de-spreader circuit 820 comprises:

a pair of inputs I and Q, a pair of digital multipliers 825 826, a pair of low pass filters 827 828, a code generator and acquisition and tracking circuit and a scale factor circuit 829, the scale factor circuit coupled to a circuit output and coupled to both inputs and both low pass filters, each digital multiplier coupled to a circuit input and to a low pass filter, the code generator and acquisition and tracking circuit coupled to an input and to each digital multiplier, and each low pass filter further coupled to a circuit output selected I and selected Q.

Referring to FIG. 6A, in an embodiment, the code generator acquisition and tracking circuit is adapted to track a common pilot channel 823.

Figure 6B:
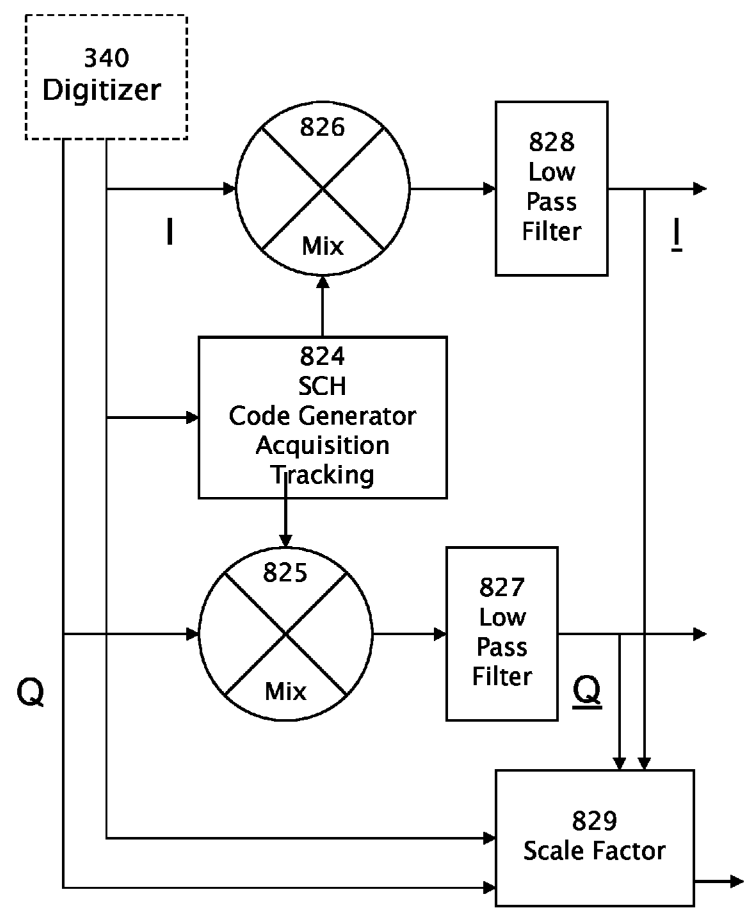

Referring to FIG. 6B, in an embodiment, the code generator acquisition and tracking circuit is adapted to track a synchronization channel 824.

As a result the advantages of a multiple antenna element phased array higher antenna gain by combining signal higher diversity gain to mitigate the effects of multipath fading spatial suppression of adjacent cell interference are presented to a single input radio frequency receiver.

Figure 7:
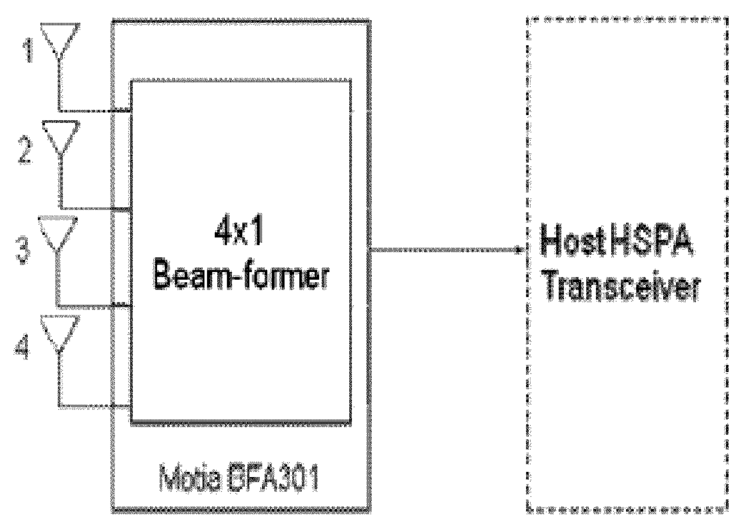
FIGS. 7 and 8 illustrate 4in/1out configuration and 4in/2out configuration of some of the embodiments, respectively.

Referring now to FIG. 7, which shows the 4in/1out configuration of the invention—the signals from the four antennas are jointly combined to provide the UMTS/HSPA transceiver with a RX signal with improved Signal-to-Interference-plus-Noise Ratio (SINR). The RX signal fed to the host radio benefits from both the spatial combining gain and the diversity gain of having four independent antennas.

The present invention is a solid-state device comprising the following circuits:

a plurality of adaptive amplifier modulator circuits;

at least one thin radiofrequency digitizer circuit;

a modem baseband processor and microcode power selector interface a PN code selective beamforming engine circuit; and a many input single output radio frequency (RF) combiner circuit.

Figure 8:
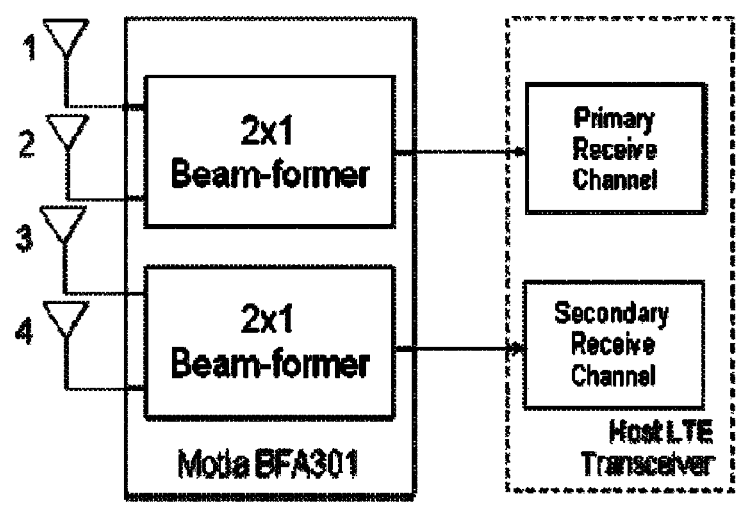

Referring now to FIG. 8 which shows the 4in/2out configuration of the invention, intended for use with advanced type 2/3/4 receivers of LTE. In this configuration, the signals from antennas 1 and 2 are combined independently from the antennas 3 and 4 signals, and the invention produces two separate signals, each with improved SINR. In an embodiment the device is further coupled to a multiple input multiple output modem configured in spatial multiplexing operational mode.

In the 4in/2out configuration, the invention can provide beam-forming gain to a MIMO modem operating in spatial multiplexing mode or a diversity combining modem in a non-spatial multiplexing mode.

In an embodiment the device is further coupled to a multiple input multiple output modem configured in diversity combining operational mode.

In an embodiment the device is further coupled to a transmit path in a time-division duplexing system to produce a transmit phased array system.

A single chip diversity beamforming antenna array processor is disclosed in the present patent application.

The processor utilizes low-power and low area circuits to achieve combining gain, mitigate the effects of multipath fading, provide spatial suppression, and provide diversity gain to a single input receiver. The device is radiofrequency transparent yet provides antenna gain by selective three G and four G code acquisition and tracking of a desired downlink channel.

The present invention contributes to improved performance in MIMO 4G systems using multi-antenna systems to achieve the following:

Improve the SINR of signals whenever needed and wherever possible within the cell boundaries, and Share the SINR available among all users in the cell in a manner to maximize the data throughput to all users and the spatial capacity of the cell Both of these capabilities are supported and enhanced by improved SINR at the UE receiver. It is particularly emphasized that the self-directed operation of the present invention makes the operation transparent to any closed-loop MIMO/beamforming. The independent processing of each antenna pair is distinguishable from conventional circuits.

The device is easily distinguished from conventional phased array antenna circuits by providing a radiofrequency output compatible to a single input receiver having a legacy design. The device is easily distinguished from conventional phased array antenna circuits by power conservation and reduced area consumption.

The device is easily distinguished from conventional phased array antenna circuits by spatial suppression of adjacent cell interference.

The device is easily distinguished from conventional phased array antenna circuits by eliminating large and power-hungry analog to digital converters and voltage controlled oscillators and frequency synthesizers. It offers substantial performance and cost advantages over digital signal processing alternatives.

The present invention may be easily distinguished from more costly and larger conventional superheterodyne circuits containing a local oscillator which employs VCO and frequency synthesizer means.

The VCO at high frequency employs an inductor and capacitor in the tank to realize good phase noise. It is big (inductor) and consumes more power. A synthesizer circuit also consumes high power since it operates at RF frequency. A superheterodyne downconverter is also a high power device since it requires high LO level.

In contrast a sampling of the present invention operates at lower frequency thus consuming lower power. It does not need an inductor and capacitor in the tank. Instead it uses a resistor and capacitor which is much smaller. The phase noise is not as good but is not critical to make beam-forming work which only needs to retain the relative signal phase at the sampler.

The sampler is a simple sample and hold circuit which is realized with switch and capacitor. When the switch is closed, the buffer amplifier charges the capacitor (sampling). When the switch is open, the capacitor holds the signal voltage (hold). Thus the present invention is patentably distinguished by comprising a sampler which is small and low power as well.

The techniques described herein can be implemented in digital electronic circuitry, or in computer hardware, firmware, software, or in combinations of them. The techniques can be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps of the techniques described herein can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application-specific integrated circuit). Modules can refer to portions of the computer program and/or the processor/special circuitry that implements that functionality.

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry. The special purpose logic circuit can incorporate a state machine implementation which provides the required control flow for the operation.

A number of embodiments of the invention have been described. Nevertheless, it will be understood that various modifications may be made without departing from the spirit and scope of the invention. For example, other network topologies may be used. Accordingly, other embodiments are within the scope of the following claims.

The invention claimed is:

1. A method for controlling an array of antennas, the method comprising:

receiving signals from a plurality of antenna elements in an adaptive array antenna;

determining a digital amplitude and a phase for each of the signals;

spreading signals out by multiplying parameters in accordance with a tracking circuit output, determining a scale factor and a pair of values for each of the antenna elements;

determining a reference signal;

determining a phase angle correction between the reference signal and each of the signals, modulating each of the signals by a set of normalized weights, and combining the modulated signals from all antenna elements as an input to a single input receiver, wherein the pair of values includes a phase shift for each of the signals.

* * * * *